United States Patent [19]

Merkovsky

[11] Patent Number: 4,728,479
[45] Date of Patent: Mar. 1, 1988

[54] HIGH PRESSURE SEAL FITTING WITH BUILT-IN LOW PRESSURE SEAL ARRANGEMENT

[75] Inventor: Daniel Merkovsky, Monroeville, Pa.

[73] Assignee: Westinghouse Electric Corp., Pittsburgh, Pa.

[21] Appl. No.: 817,366

[22] Filed: Jan. 9, 1986

[51] Int. Cl.$^4$ .............................................. G21C 13/00
[52] U.S. Cl. .................................. 376/203; 376/263; 285/111
[58] Field of Search .................. 376/203, 263; 277/84, 277/85, 27; 285/95, 99, 109, 111, 110, 113

[56] References Cited

U.S. PATENT DOCUMENTS

| | | | |
|---|---|---|---|
| 1,868,014 | 7/1932 | Lucas | 285/111 |
| 3,447,819 | 6/1969 | Borsum | 285/111 |
| 4,047,742 | 9/1977 | Haferkamp | 376/203 |
| 4,101,148 | 7/1978 | Lee | 376/203 |

*Primary Examiner*—Donald P. Walsh
*Attorney, Agent, or Firm*—D. C. Abeles

[57] ABSTRACT

A high pressure seal fitting with a built-in low pressure seal arrangement for sealing a space defined by an inner diameter of a pipe and a rod slidably disposed within the first pipe and extending beyond and end of the first pipe. The fitting includes a fitting body provided with an axial passage for slidably accommodating the rod and having a first end region constructed for engaging the end of the pipe for forming a high pressure seal between the pipe and the fitting body, and a second end region opposite the first end region and including an outer circumferential protrusion having the shape of a ferrule for cooperating with components utilized to form a compression seal to form a releasable high pressure seal. The fitting body further includes a low pressure sealing device disposed in the axial passage at the second end region of the fitting body for maintaining a low pressure seal between the fitting body and the rod when the releasable high pressure seal is disconnected.

13 Claims, 4 Drawing Figures

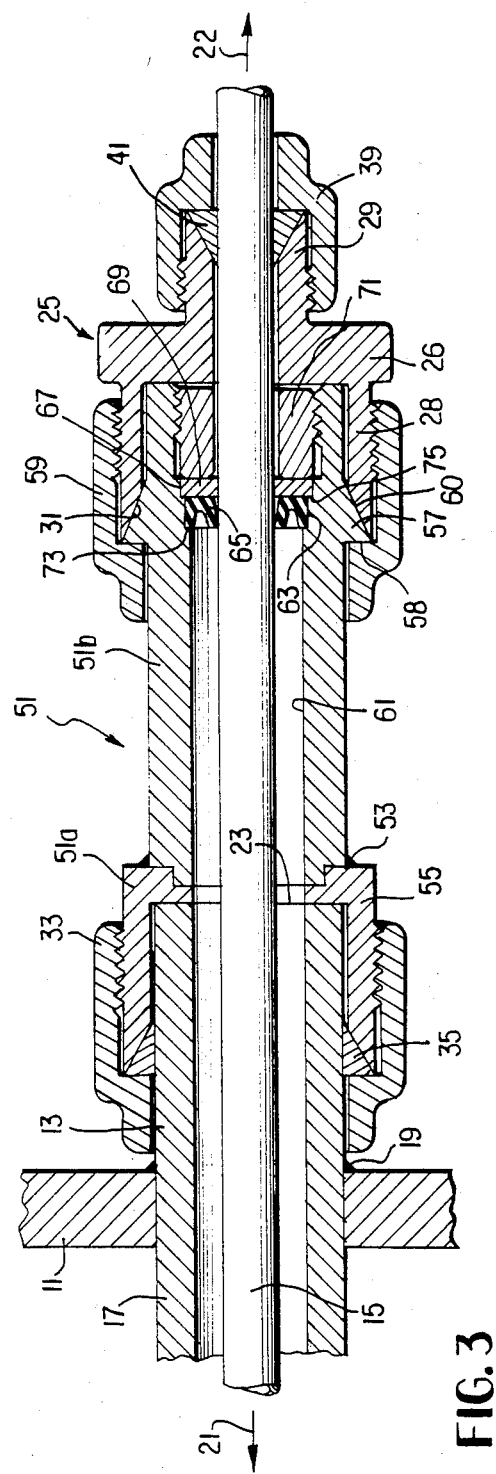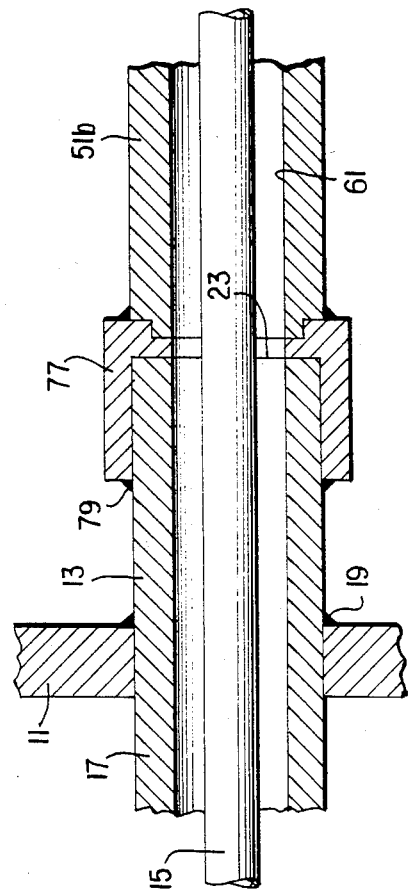

HIGH PRESSURE SEAL FITTING WITH BUILT-IN LOW PRESSURE SEAL ARRANGEMENT

BACKGROUND OF THE INVENTION

1. Field of the Invention

The invention relates to fluid seals and more particularly to a fitting for a high pressure seal that must be periodically disassembled and replaced with a low pressure seal arrangement. The invention has particular utility in connection with a nuclear reactor wherein the high pressure seal between the thimble guide tube and the thimble at the seal table on the exterior of the well in which the reactor vessel is seated must be released and replaced with a low pressure seal during the refueling of the reactor.

2. Description of the Prior Art

Refueling of pressurized water reactors is an established, routine operation carried out with a high degree of reliabilty. Refueling is normally performed once or twice a year depending upon load requirements. For the sake of economy, it is desirable that the refueling operation be accomplished as quickly as possible. In recent years a number of design innovations have considerably simplified refueling operations, reducing the number of operator actions required during refueling and, hence, considerably reducing the amount of time for a complete refueling operation from approximately four weeks, to less than seven days. The present invention is generally directed toward further simplifying fying the refueling operations, minimizing the downtime of the reactor during such refueling, and increasing the reliability of certain components which must be manipulated during refueling.

In a typical pressurized water nuclear reactor arrangement, the reactor vessel is seated in a concrete well and contains the usual nuclear reactor core and instrumentation. Among the instrumentation are a plurality of stainless steel tubes, referred to as thimbles, which extend, during normal reactor operation, from the upper plate of the core downwardly to the bottom of the vessel where they pass through a penetration in the bottom of the vessel and terminate at a point exterior to the vessel well. The thimble is normally empty, however, approximately once a month a neutron flux detector is pushed through the thimble to the top of the core and then slowly retracted while neutron flux readings are taken with suitable flux mapping equipment to which the detector is connected outside the thimble.

The thimble itself is housed in a larger stainless steel tube, referred to as a guide tube, which stainless steel tube, referred to as a guide tube, which is welded to the bottom of the vessel and which forms the vessel penetration through which the thimble passes. The interior of the guide tube is exposed to the reactor cooling water and hence the operating pressure of the system, whereas the inside of the thimble is essentialy dry and at atmospheric pressure. The guide tube extends on the exterior of the vessel from the vessel pentration through the concrete wall forming the well of the vessel to a stainless steel plate, known as the seal table. A termination stub of the guide tube penetrates the seal table and is welded thereto. The thimble passes entirely through the guide tube and extends beyond the seal table toward the flux mapping equipment.

Because the space between the outer surface of the thimble and the inner surface of the guide tube is exposed to the operating pressure of the reactor, it is necessary during normal reactor operation to have a high pressure seal at the seal table at the point where the thimble exits the guide tube in order to prevent reactor coolant from being expelled from the guide tube.

During a refueling operation, it is necessary to retract the thimble a number of feet in order to remove it from the volume of the nuclear core. To do this, the high pressure seal at the seal table between the guide tube stub and the thimble is disassembled so that the thimble can be retracted the necessary distance. Although the reactor is powered down during the refueling operation and the water pressure within the vessel is concomitantly reduced, it is still necessary to have a low pressure seal between the guide tube stub and the thimble because the seal table is approximately at or below the upper flange of the vessel and is thus below the water level of the refueling canal which is normally filled during the refueling operation.

In the past it was necessary to temporarily lower the water level within the vessel to a point below the seal table during the time that the high pressure seal at the seal table was disassembled and a low pressure seal installed in its place. Thereafter, the vessel and refueling canal would be filled with water to provide sufficient shielding to keep the radiation within an acceptable level when fuel assemblies are removed from the vessel.

The prior technique of physically installing a low pressure seal at the seal table after disassembling the high pressure seal, and then, after the refueling operation, subsequently reinstalling the high pressure seal, has several disadvantages. First of all, it is time consuming because the water level has to be reduced to a level below the seal table each time the seal between the guide tube stub and the thimble is replaced. Further, the action of changing from a high pressure seal to a low pressure seal, and vice versa, is time consuming in that, depending on the design of the reactor, there could be in excess of 50 thimbles, each of which must be retracted through a separate guide tube stub at the seal table. Another disadvantage is that the reliability of the seal at the seal table between the guide tube stub and thimble could be impaired in the course of changing from one to the other type of seal. The reason for this is that the high pressure seal is a compression type seal employing a compression ring, or ferrule, which is compressed via a lock nut to form a friction-tight, fluid seal at the exterior of the guide tube stub. When the high pressure seal is disassembled, the ferrule remains in place and is utilized as an anchor point for the compression nut in the formation of the low pressure seal. If during this conversion from a high pressure seal to a low pressure seal, the ferrule slips, the integrity of the low pressure seal may be impaired. Further, and more importantly, when the high pressure seal is reassembled the ferrule, once having slipped, would have to be removed and a portion of the guide tube stub may have to be cut off in order to provide a clean, unmarred surface for the compression fitting of the high pressure seal. Since the guide tube stub only projects beyond the seal table by several inches, the entire guide tube may eventually have to be replaced in order to provide a sufficiently long guide tube stub on which to form a high pressure compression seal.

SUMMARY OF THE INVENTION

It is an object of the present invention to provide a high pressure compression seal fitting which incorporates a built-in low pressure seal arrangement in order to eliminate the actions required to physically disassemble a high pressure seal and to install a low pressure seal in its place, and vice versa, and at the same time to provide such a fitting which is both simple in construction and highly reliable.

The above and other objects are accomplished according to the invention by the provision of a high pressure seal fitting with a built-in low pressure seal arrangement for sealing a space defined by an inner diameter of a pipe and a rod slidably disposed within the pipe and extending beyond an end of the pipe, the fitting including:

a fitting body provided with an axial passage for slidably accommodating the rod and having a first end region constructed for engaging the end of the pipe for forming a high pressure seal between the pipe and the fitting body, and a second end region opposite the first end region and including an outer circumferential protrusion having the shape of a ferrule for cooperating with a compression fitting and nut to form a releasable high pressure seal between the fitting body and the rod; and low pressure seal means disposed in the axial passage at the second end region of the fitting body for maintaining a low pressure seal between the fitting body and the rod when the releasable high pressure seal is disassembled.

As used herein, rod is intended to include a hollow rod such as a pipe. Because the low pressure seal is built into the fitting body, when the high pressure compression seal between the fitting body and the rod is disassembled, the low pressure seal is automatically in place at the time that the high pressure compression seal is released. Thus, in the context of a seal between a guide tube stub and a thimble at a seal table of a nuclear reactor as discussed above, such a fitting body avoids the actions required in lowering the water level to effect the low pressure seal as was required in the past, and also avoids the reliability problems involved in using the same ferrule, which heretofore was a separate component, to effect multiple compression seals.

Further, because the circumferential protrusion which forms the ferrule of the high pressure seal at the second end region of the fitting body is integral with the fitting body itself, the problem of the ferrule loosening at the guide tube stub is eliminated. Preferably, the fitting body is comprised of first and second components which are joined together, for example by a welded joint. The first component may comprise a socket which contains the first end region for engaging the end of the pipe, or guide tube stub, and for forming a high pressure seal therewith. The second component incorporates the second end region with the integral ferrule and low pressure seal means. Accordingly, in the event that the integral ferrule does become damaged, the second component of the fitting body can be removed, for example by breaking the weld with the first component, and a new second component installed in its place. The guide tube stub is thus preserved, avoiding the possibility of having to replace an entire guide tube as could happen with the use of the prior technique for sealing the guide tube stub to the thimble.

BRIEF DESCRIPTION OF THE DRAWINGS

FIG. 3 illustrates an axial sectional view of a high pressure seal fitting according to one embodiment of the invention.

FIG. 4 illustrates another embodiment of a high pressure seal fitting according to the invention.

DESCRIPTION OF THE PREFERRED EMBODIMENTS

Figure 1:
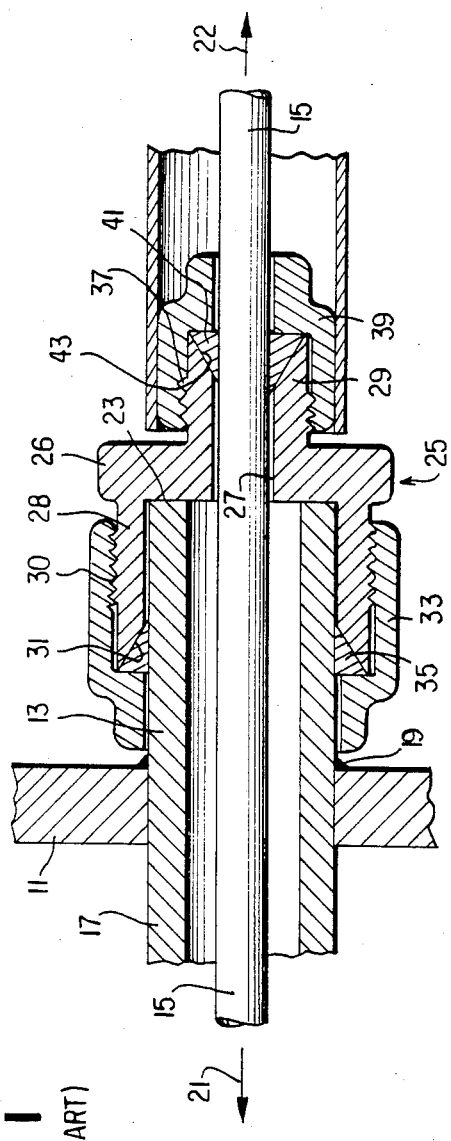
FIG. 1 illustrates an axial sectional view of a high pressure seal at the seal table between a guide tube stub and thimble in accordance with the prior art.

FIG. 1 illustrates the prior art construction of a high pressure seal formed at a seal table 11 between a guide tube stub 13 and a thimble 15. Guide tube stub 13 is the terminal portion of a guide tube 17 which penetrates the seal table 11 and is sealed thereto by a weld 19. Guide tube 17 and thimble 15 disposed therein extend in the direction of arrow 21 toward the bottom of a nuclear reactor vessel (not shown). Guide tube 17 and thimble 15 both penetrate the bottom of the vessel, with the guide tube being welded to the vessel and the thimble extending up through the core in the usual manner. The space between the outer surface of thimble 15 and the inner surface of guide tube 17 is subjected to the normal operating pressure of the reactor vessel and therefore the end 23 of the guide tube stub must be sealed to the thimble by means of a high pressure seal.

Heretofore, the seal has been formed as shown in FIG. 1 by a standard compression seal comprised of a reducer union 25 having a main body 26 with a throughbore 27 through which the thimble 15 passes, and oppositely directed projections 28 and 29. Projection 28 forms a socket for receiving the end region of the guide tube stub 13 and has exterior threads 30 and a compression surface 31 which is inclined with respect to the surface of the guide tube stub. A lock nut 33 is positioned on the guide tube stub 13 for engaging the threads 30 of projection 28 for compressing a conventional ferrule 35 between the guide tube stub 13 and compression surface 31 of projection 28 to form a high pressure seal in a manner well understood by those skilled in the art. Similarly, at the other end of reducer union 25, projection 29 has exterior threads 37 which cooperate with a lock nut 39 for compressing another conventional ferrule 41 between thimble 15 and a corresponding compression surface 43 of projection 29 to form a further high compression seal.

During a refueling operation, it is necessary to retract the thimble a sufficient distance to remove it from the nuclear core (not shown) disposed in the reactor vessel (not shown). In the past this has been accomplished by lowering the water in the vessel to a level below that of seal table 11 so that there is no water pressure at the seal table, loosening lock nut 33, retracting thimble 15, forming a low pressure seal as will be described in connection with FIG. 2, and raising the water level in the refueling canal to the required level for the refueling operation.

Figure 2:
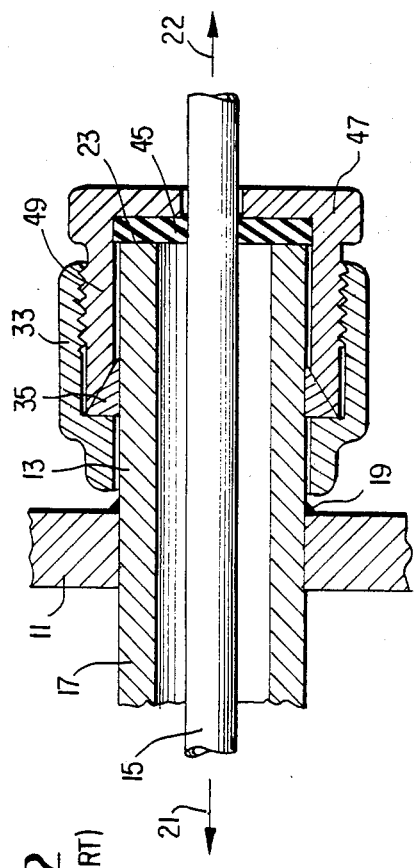
FIG. 2 illustrates an axial sectional view of a low pressure seal at a seal table between a guide tube stub and a thimble in accordance with the prior art.

Referring to FIG. 2 wherein the components corresponding to those in FIG. 1 are given like reference numerals, the low pressure seal heretofore employed has been formed by placing a split rubber ring 45 over thimble 15 so as to abut against the end 23 of guide tube stub 13. The outside diameter of rubber ring 45 substantially corresponds to the outside diameter of guide tube stub 13 and the inner diameter of rubber ring 45 substantially corresponds to the outside diameter of thimble 15. Thereafter, a retaining cap 47 having an axial slot (not shown) and a projection 49 corresponding to projection 28 in FIG. 1, is slipped over guide tube 15 and cooperates with lock nut 33 to compress rubber ring 45 against the end of the guide tube stub and against the surface of thimble 15 to form a low pressure seal. The ferrule 35, which has a tight friction fit about thimble 15 as a result of its initial compression in the high pressure seal formed according to FIG. 1, is used as an anchor point for lock nut 33 in pulling retaining cap 47 in against rubber ring 45.

After the refueling operation is completed, the water level must again be temporarily dropped to below the level of the seal table so that the low pressure seal of FIG. 2 may be disassembled and the high pressure seal of FIG. 1 reassembled.

The use of two separate seal arrangements for effecting the high and low pressure seals, respectively, is not only time consuming in that it requires a temporary reduction of the water level while one seal is being disassembled and the other seal installed, but also there is the risk that in disassembling and assembling the seals, the metal to metal seal provided by the ferrule 35 against the guide tube stub 13 may become imparied. Generally, when this happens, the surface of the guide tube stub beneath the ferrule is no longer suitable for effecting a compression seal and therefore a portion of the guide tube stub may have to be cut off. This presents a problem because the guide tube stub extends beyond the seal table only by several inches and therefore it is conceivable that the entire guide tube may have to be replaced in order to provide a sufficient length of guide tube stub to accommodate a new high pressure compression seal. The present invention overcomes these problems by the provision of a high pressure seal fitting body which incorporates a low pressure seal arrangement as shown in the embodiment of the invention illustrated in FIGS. 3 and 4, respectively, and wherein components common to those illustrated in FIGS. 1 and 2 are identified by the same reference numeral.

Referring first to FIG. 3, there is provided in accordance with the invention a fitting body 51 interposed between reducer union 25, which is sealed to thimble 15 as in FIG. 1, and lock nut 33 and ferrule 35 which are disposed on the guide tube stub also as in FIG. 1. The fitting body 51 comprises two component 51a and 51b, which are welded together at 53. Component 51a comprises a socket 55 which is configured to receive the end region of guide tube stub 13 and to cooperate with lock nut 33 and ferrule 35 for forming a high pressure compression seal in the usual manner.

At the other end of fitting body 51, component 51b is provided in the region of its free end with an integral projection 57 which projects outwardly around the entire circumference of component 51b and is shaped to simulate a conventional ferrule. Accordingly, projection 57 has a radial surface 58 which serves as a stop for a lock nut 59 and an inclined surface 60 which is compressed against the corresponding compression surface 31 of reducer union 25 to form a high pressure seal therewith.

Fitting body 51 has an inner surface 61 defining a through passage for slidably accommodating the thimble 15. Inner surface 61 is provided in the region of the free end of component 51b with a first annular recess 63 for accommodating a rubber seal ring 65 which has a U-shaped axial cross section, and a second annular recess 67 which has a greater diameter than the first recess 63 for accommodating a stainless washer 69. Between annular recess 67 and the free end of component 51b the inner surface 61 is provided with threads for accommodating a seal nut 71. Seal ring 65 is a conventional U-shaped cup seal which may be made for example from Buna N material, having a durometer hardness 90, such a seal being commercially available from Buckeye Rubber & Packing Company, Cleveland, Ohio. Seal nut 71 is provided with a suitable slot (not shown) in its axial end facing reducer union body 26 for receiving an appropriate tool for tightening nut 71 against washer 69, which in turn presses against the adjacent axial end of U-shaped seal 65. Recess 63 in which U-shaped seal 65 is disposed defines a radial surface 73 which presents an axial abutment for the other end of U-shaped seal 65, so that seal 65 is essentially held between axial abutment 73 and washer 69. Additionally, the annular recess 67 in which washer 69 is seated defines a radial surface 75 which presents an axial abutment with respect to washer 69 so that washer 69 is prevented from compressing cup-shaped seal 65 beyond its design limits.

Use of the fitting body 51 in the manner illustrated in FIG. 3 thus permits the guide tube stub 13 to be sealed to the thimble 15 with respect to high operating pressures by virtue of the high pressure compression seals formed by lock nut 33, ferrule 35 and socket 55; by lock nut 59, protrusion 25; and lock nut diameter projection 28 of reducer union 25; and lock nut 39, ferrule 41 and the small diameter projection 29 of reducer union 25. Further, the seal fitting 51 has a low pressure seal built into its end adjacent reducer union 25 so that, when lock nut 59 is loosened and the thimble 15 retracted, the U-shaped cup seal 65 maintains a low pressure seal between the inner surface 61 of component 51b and the thimble 15.

It may be noted that the high pressure compression seal formed at the guide tube stub 13 by lock nut 33, ferrule 35 and socket 55 need never be disassembled when releasing the high pressure seal, thus avoiding the possibility of marring the surface of the guide tube stub 13. If by chance the projection 57 becomes damaged requiring the replacement of component 51b, the weld 53 may simply be broken down in order to permit removal and replacement of component 51b after which the weld 53 is again made. It may be noted that the weld 53 should be made only after the lock nut 59 is slipped over the component 51b, otherwise it would not be possible to install the lock nut 59 in the position shown.

When it is necessary to reassemble the high pressure seal for normal operating pressures of the reactor, the thimble is slid through the fitting 51 toward the reactor until the reducer union 25 is in the correct position juxtaposed the projection 57 so that lock nut 59 can be secured to re-create the high pressure compression seal at that point.

FIG. 4 illustrates an embodiment of the invention which is similar to FIG. 3 except that the component 51a of FIG. 3 which is adapted to form a compression seal has been replaced by a socket 77 which is welded to the guide tube stub 13 as shown by weld joint 79. The embodiment of FIG. 4 would again permit the component 51b to be replaced by simply breaking the weld 53 in order to release component 51b from the end of the guide tube stub. A new component 51b could then be installed on the guide tube stub via a new weld joint 53.

It will be understood that the above description of the present invention is susceptible to various modifications, changes and adaptations, and the same are intended to be comprehended within the meaning and range of equivalents of the appended claims.

I claim:

1. A high pressure seal fitting with a built-in low pressure seal arrangement for sealing a space defined by an inner diameter of a pipe and a rod slidably disposed within the pipe and extending beyond an end of the pipe, said fitting comprising:

a fitting body provided with an axial passage for slidably accommodating the rod and having a first end region constructed for engaging the end of the pipe for forming a high pressure seal between the pipe and said fitting body, and a second end region opposite said first end region and including an outer circumferential protrusion having the shape of a ferrule for cooperating with components utilized to form a releasable high pressure compression seal; and low pressure seal means disposed in the axial passage at said second end region of said fitting body for maintaining a low pressure seal between said fitting body and the rod when said releasable high pressure seal is disconnected, said fitting body being disposed radially intermediate said releasable high pressure compression seal and said low pressure seal means.

2. A fitting according to claim 1, wherein said fitting body has an inner surface defining the axial passage and said low pressure seal means comprises a flexible ring disposed in the axial passage at said second end region for filling a space defined by said inner surface and the rod, and compression means for compressing said flexible ring for forming the low pressure seal.

3. A fitting according to claim 2, wherein said compression means includes a seal nut, threads provided at said second end region for engaging said seal nut, and a first annular abutment provided on said inner surface at said second end region between said threads and said first end region, said first annular abutment providing a stop for said flexible ring which can be urged against said first annular abutment by appropriate rotation of said seal nut via said threads.

4. A fitting according to claim 3, wherein said first annular abutment is formed by an annular recess in said inner surface.

5. A fitting according to claim 3, wherein said low pressure seal means includes a seal washer disposed between said flexible ring and said seal nut.

6. A fitting according to claim 5, wherein said inner surface includes a second annular abutment between said first annular abutment and said threads which forms a stop for said seal washer.

7. A fitting according to claim 2, wherein said flexible ring has a U-shaped axial cross section.

8. A fitting according to claim 1, wherein the first end region of said fitting body is provided with exterior threads and an inwardly directed compression surface for cooperating with a compression nut and ferrule appropriately arranged on the pipe.

9. A fitting according to claim 1, wherein the first end region of said fitting body is adapted to be welded to the pipe.

10. A fitting according to claim 1, wherein said fitting body is comprised of first and second separate components connected together by a fluid tight joint, said first component containing said first end region and said second component containing said second end region.

11. A fitting according to claim 10, wherein said first component is provided with exterior threads and an inwardly directed compression surface for cooperating with a compression nut and ferrule appropriately arranged on the pipe.

12. A fitting according to cliam 10, wherein said first component is adapted to be welded to the pipe.

13. A fitting according to claim 10, wherein said first and second components are connected together by a welded joint.

* * * * *